(12) United States Patent
Chen et al.

(10) Patent No.: US 7,334,935 B1
(45) Date of Patent: Feb. 26, 2008

(54) LIGHT POSITIONING FRAME FOR A BACK LIGHT MODULE

(75) Inventors: Ching-Hsiang Chen, Kaohsiung (TW); Wei-Hsuan Chen, Kaohsiung (TW)

(73) Assignee: Radiant Opto-Electronics Corporation (TW)

( * ) Notice: Subject to any disclaimer, the term of this patent is extended or adjusted under 35 U.S.C. 154(b) by 0 days.

(21) Appl. No.: 11/598,037

(22) Filed: Nov. 13, 2006

(51) Int. Cl.
*F21V 7/04* (2006.01)

(52) U.S. Cl. .................... 362/633; 362/634
(58) Field of Classification Search ............ 362/634; 349/58
See application file for complete search history.

(56) References Cited

U.S. PATENT DOCUMENTS

| 6,634,761 | B2 * | 10/2003 | Ichikawa | 362/600 |
|---|---|---|---|---|
| 6,814,458 | B2 * | 11/2004 | Kim et al. | 362/632 |
| 7,083,318 | B2 * | 8/2006 | Ha et al. | 362/633 |
| 7,086,773 | B2 * | 8/2006 | Kim et al. | 362/621 |

* cited by examiner

*Primary Examiner*—Hargobind S. Sawhney
(74) *Attorney, Agent, or Firm*—Hershkovitz & Associates, LLC; Abe Hershkovitz

(57) ABSTRACT

A light positioning frame for a back light module includes an assembly frame composed of an outer frame, a top frame extending from a side of the outer frame, a receiving space, at least one slot defined through a top face of the top face communicating with the receiving space and a first shoulder formed on a bottom face defining the at least one slot and a mask having a base, a light source cap portion extending from a free side of the base and an extension extending into the receiving space so as to be supported by the first shoulder such that engagement between the fixed frame and the mask is finished, whereby a light source received in the mask is securely sandwiched between the fixed frame and the mask and light from the light source is dimmed by the top frame.

5 Claims, 5 Drawing Sheets

LIGHT POSITIONING FRAME FOR A BACK LIGHT MODULE

BACKGROUND OF THE INVENTION

1. Field of the Invention

The present invention relates to a light positioning frame, and more particularly to light positioning frame for a back light module so as to obviate uneven light effect on a liquid crystal display which is held by the light positioning frame.

2. Description of the Prior Art

In order to clearly show pictures from a liquid crystal display, a light source is provided by a back light module. The back light module is composed of a light source positioning frame and a mask having the light source securely positioned therein. A light guiding plate having a reflective film on the rear side of the light guiding plate is provided to the light source positioning frame and has the light source securely mounted at ends of the light guiding plate such that light from the light source is able to emit from sides of the light guiding plate. Through the reflective film, pictures on the liquid crystal display is clearly shown due to the light from the light source.

The conventional structure of the light source positioning frame is shown in FIG. 6, and has a mask (60) and a positioning frame (70). The mask (60) is securely connected to a bottom face of the positioning frame (70) via bolts. The mask (60) is composed of a light source cap (61) and a bottom plate (63) integrally formed at a bottom of the light source cap (61). When the mask (60) is assembled with the positioning frame (70), the light source cap (61) is securely connected to a bottom face of a top frame (71) of the positioning frame (70) via an adhesive tape (62). Then the bottom plate (63) and the light source cap (61) are used to clamp a light guiding plate (81) therebetween.

Due to the requirements to clearly present pictures from the liquid crystal display, the material for making the mask is a kind of metal having a light reflecting characteristic. As such, when the light source cap (61) and the bottom plate (63) are used to clamp the light guiding plate (81), light from a light source (80), preferably a light emitting diode (LED), travels from peripheral sides of the light guiding plate (81) and thus creates a linear spot light effect to the liquid crystal display module (90). That is, a line of light appears on the display. The linear spot light effect causes uneven light reflection on the liquid crystal display which is quite annoying and disturbance. In order to obviate the shortcoming, an opaque layer is provided to the bottom of the light source cap (61) to dim the light at the peripheral sides of the light guiding plate (81) such that the dispersed light on the liquid crystal display is even. However, the addition of the opaque layer increases the manufacture cost and the application of the adhesive tape (62) to secure the mask (60) to the positioning frame (70) is disadvantageous to the disassembly.

To overcome the shortcomings, the present invention tends to provide an improved light positioning frame to mitigate the aforementioned problems.

SUMMARY OF THE INVENTION

The primary objective of the present invention is to provide a light positioning frame to secure the back light module.

In one aspect of the present invention, the light positioning frame is composed of a fixed frame and a mask. The fixed frame includes an assembly frame and a side frame. The assembly frame is composed of an outer frame and a top frame integrally formed with the outer frame to have an L shaped cross section and has multiple slots defined in a top face of the top frame. Due to the L shaped cross section of the combination of the outer frame and the top frame, a receiving space is defined to communicate with each of the slots. A first shoulder is defined in a bottom face defining each of the slots and a second shoulder is extended in a direction opposite to that of the first shoulder. The mask is provided to the bottom of the fixed frame and includes a base, a light source cap portion extending from a side face of the base and an extension formed on a free side of the light source cap portion to correspond to and be received in the receiving space of the fixed frame and supported by the first shoulder.

Other objects, advantages and novel features of the invention will become more apparent from the following detailed description when taken in conjunction with the accompanying drawings.

DETAILED DESCRIPTION OF THE PREFERRED EMBODIMENT

Figure 1:
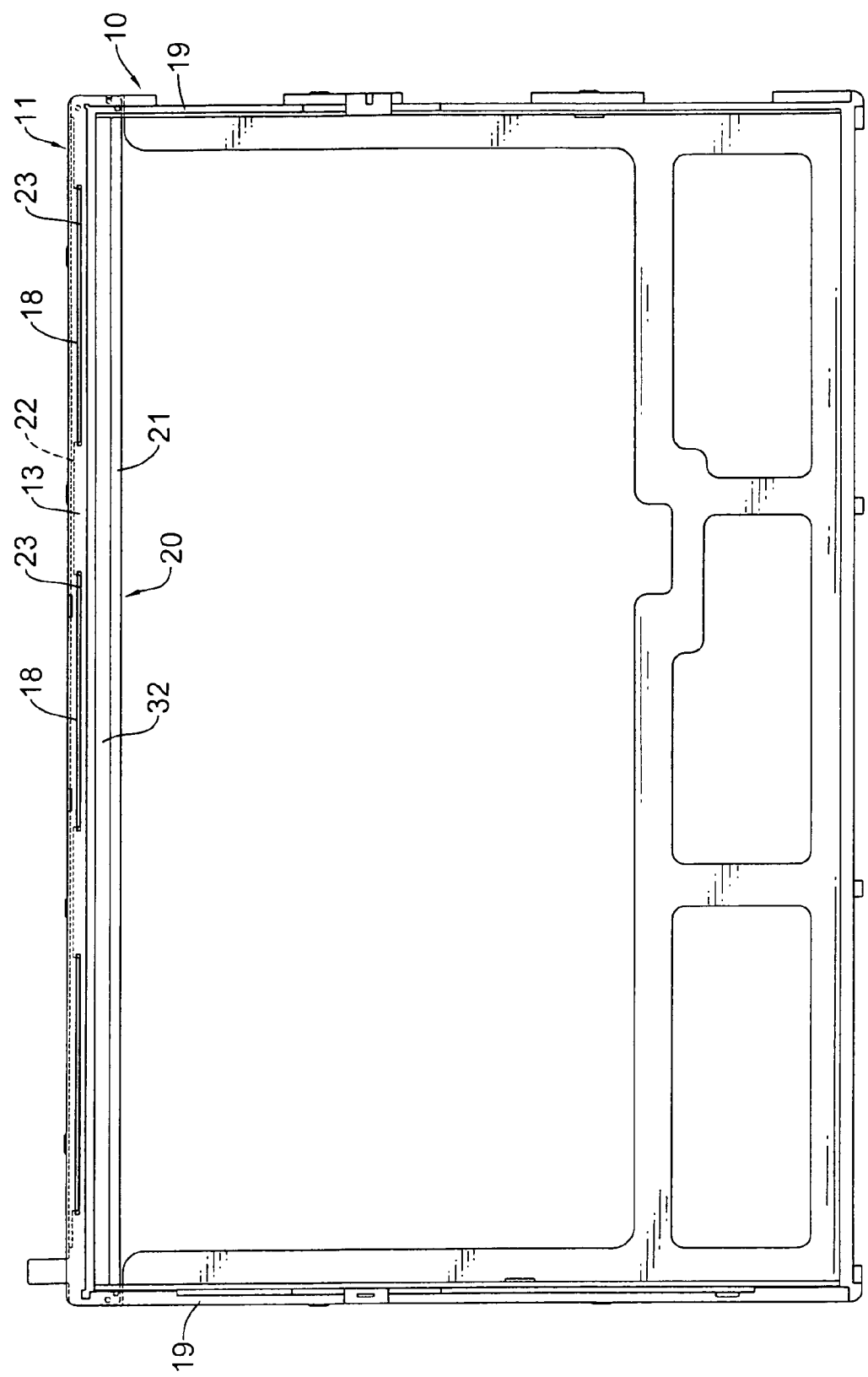
FIG. 1 is a schematic top plan view showing the light positioning frame of the present invention.
Figure 2:
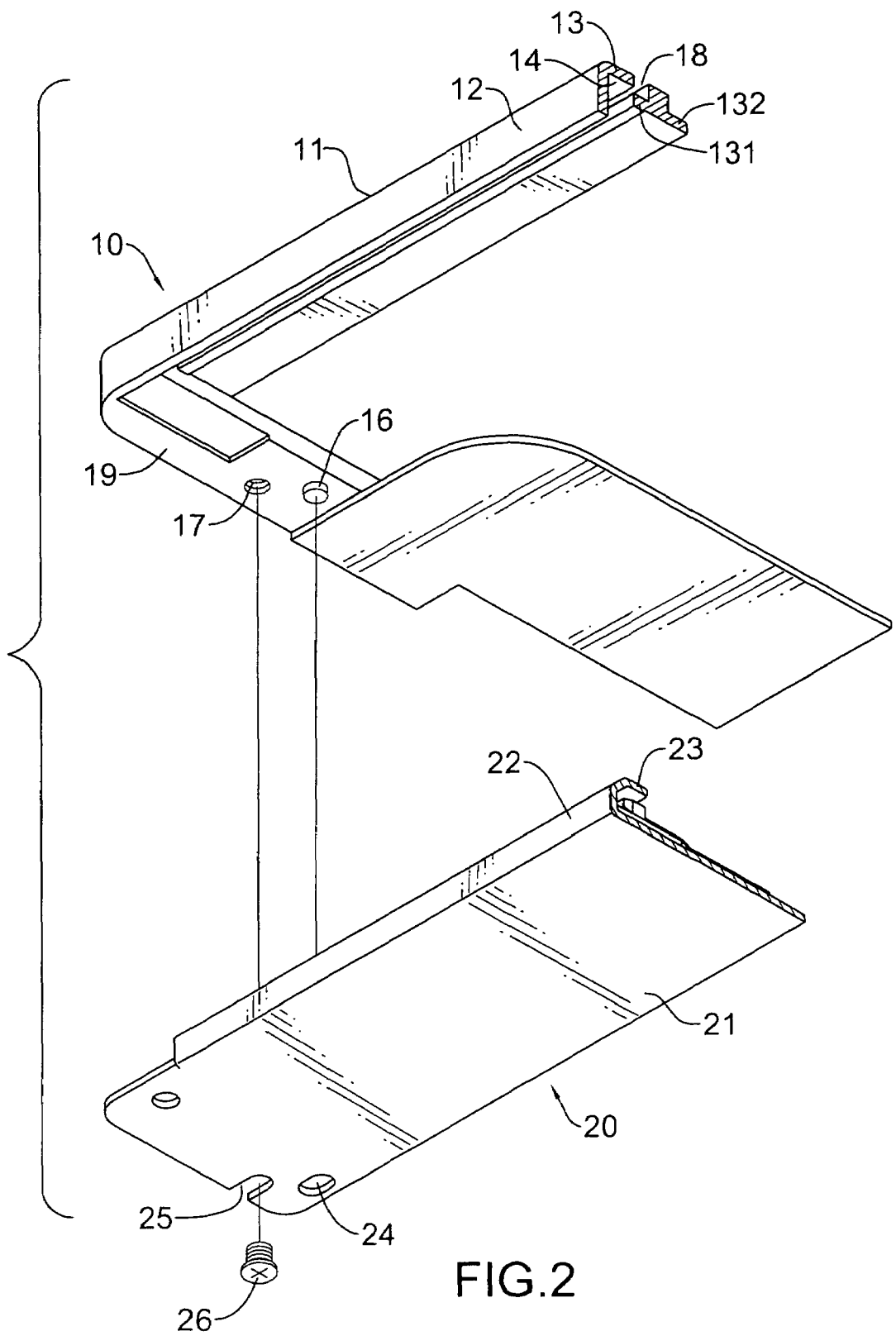
FIG. 2 is an exploded perspective view showing a portion of the light positioning frame of the present invention.

With reference to FIGS. 1 and 2, it is noted that the light positioning frame in accordance with the present invention includes a fixed frame (10) and a mask (20). The fixed frame (10) includes an assembly frame (11) and a side frame (19) together with the assembly frame (11) to form a rectangular shape. The assembly frame (11) is composed of an outer frame (12) and a top frame (13) integrally formed with the outer frame (12) to have an L shaped cross section and has multiple slots (18) defined in a top face of the top frame (13). Due to the L shaped cross section of the combination of the outer frame (12) and the top frame (13), a receiving space (14) enclosed by both the outer frame (12) and the top frame (13) is defined to communicate with each of the slots (18). A first shoulder (131) is defined in a bottom face defining each of the slots (18) and a second shoulder (132) is extended in a direction opposite to that of the first shoulder (131). The mask (20) is provided to the bottom of the fixed frame (10) and includes a base (21), a light source cap portion (22) extending from a side face of the base (21) and an extension (23) formed on a free side of the light source cap portion (22) to correspond to and be received in the receiving space (14) of the fixed frame (10) and supported by the first shoulder (131). Still, at a bottom face of each of the side frames (19) (there are two side frames (19) in accordance with the depiction of FIG. 1) a boss (16) and a threaded hole (17) are defined. Corresponding to the boss (16) and the threaded hole (17), a hole (24) is defined through the base (21) to receive therein the boss (16) and a bolt (26) is extending through a cutout (25) defined in a side face of the base (21) to be threadingly extended into the threaded hole (17).

Figure 3:
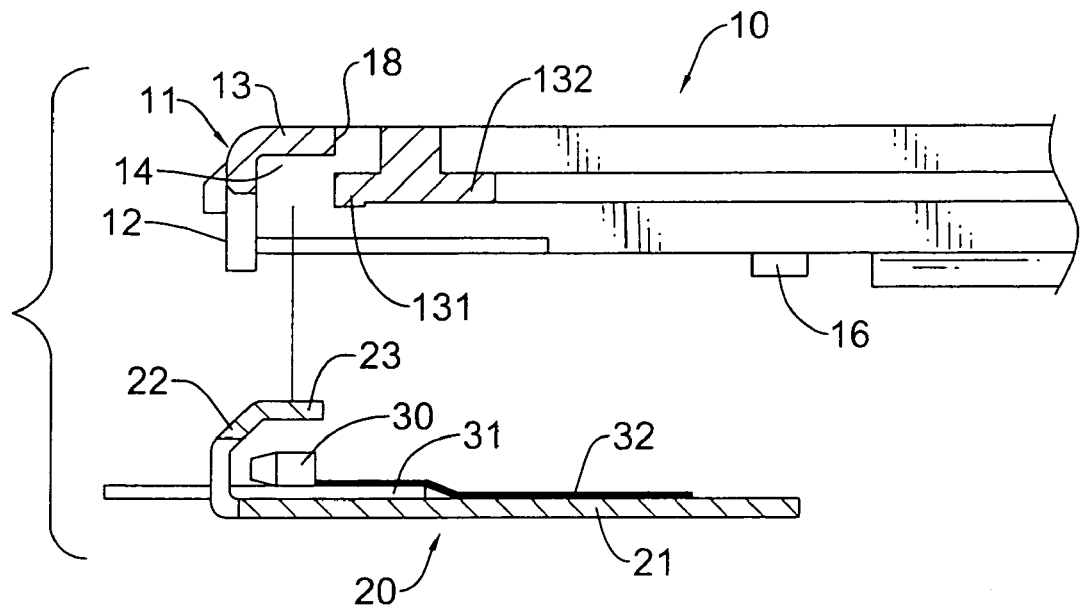
FIG. 3 is an exploded cross sectional view showing that the fixed frame is to be assembled with the mask.
Figure 4:
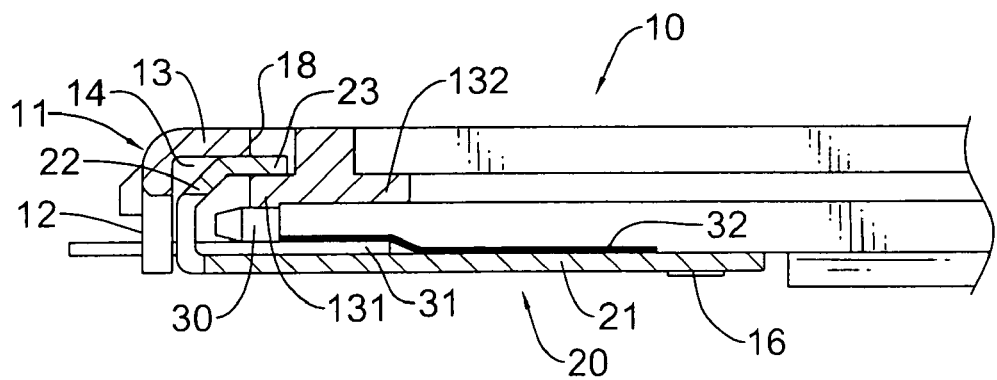
FIG. 4 is a schematically cross sectional view showing the assembly between the fixed frame and the mask.
Figure 5:
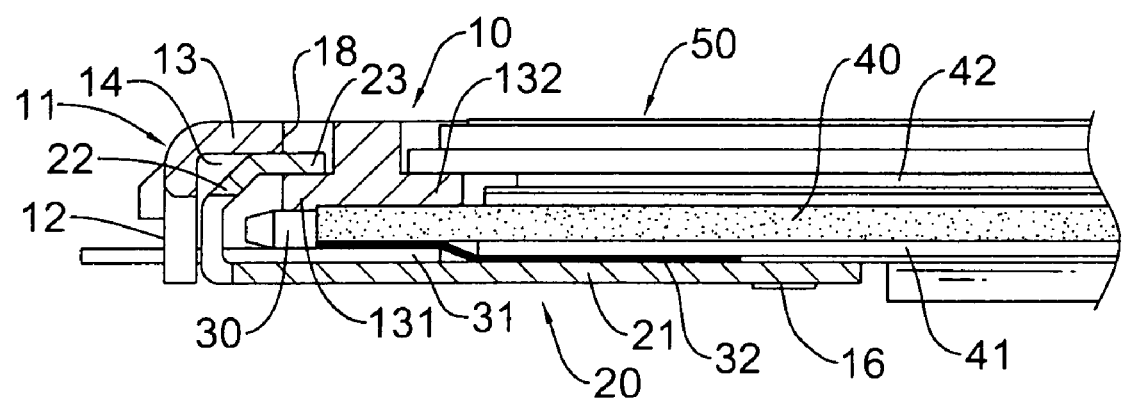
FIG. 5 is a schematically cross sectional view showing that the light positioning frame of the present invention is assembled with a light guiding plate and a liquid crystal module.
Figure 6:
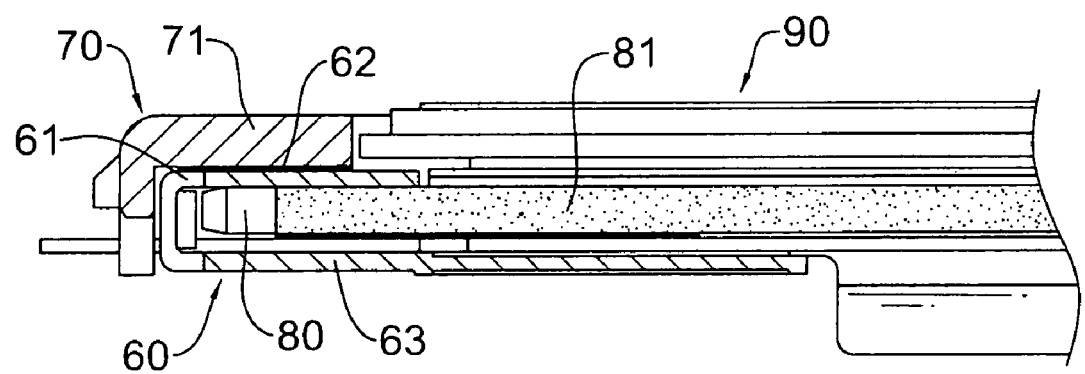
FIG. 6 is a schematically cross sectional view showing the conventional light positioning frame.

With reference to FIGS. 3 and 4, it is noted that when the fixed frame (10) is to be assembled with the mask (20) which has multiple LEDs (30) received inside the light source cap portion (22), a circuit board (31) supported by and attached to a top face of the base (21) inside the light source cap portion (22) via an adhesive tape (32), the extension (23) is extended into the receiving space (14) to allow the free side of the extension (23) to be supported by a top face of the first shoulder (131) and the LEDs (30) are thus sandwiched between a bottom face of the first shoulder (131) and the top face of the base (21). Due to the engagement between the extension (23) and the first shoulder (131), the fixed frame (10) and the mask (20) are assembled. To enhance the connection therebetween the boss (16) is extended into the hole (24) and the bolt (26) is extended through the cutout (25) and into the threaded hole (17) to secure the engagement between the fixed frame (10) and the mask (20).

After the engagement between the fixed frame (10) and the mask (20) is finished, a light guiding plate (40) having a reflective film (41) on the rear of the light guiding plate (40) is placed inside the fixed frame (10) to allow a free side of the light guiding plate (40) to be engaged with the base (21) and adjacent to the LEDs (30). An optical film (42) is placed on top of the light guiding plate (40) and a liquid crystal module (50) is placed on top of the optical film (42) to allow a free side of the liquid crystal module (50) to be supported by a top face of the second shoulder (132).

Based on the description above it is concluded that the adhesive tape for the engagement between the fixed frame and the fixed frame is excluded in that the engagement between the fixed frame (10) and the mask (20) is based on the engagement between extension (23) of the mask (20) and the receiving space (14) of the fixed frame (10). Thus manufacture cost is reduced. Furthermore, because the fixed frame (10) is made of plastic which is non-reflective and placed on top of the light guiding plate, the spot light effect is obviated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light positioning frame for a back light module, the light positioning frame comprising:
    a fixed frame having an assembly frame which is composed of an outer frame, a top frame extending from a side of the outer frame to have a L shaped cross section, a receiving space enclosed by the outer frame and the top frame, at least one slot defined through a top face of the top frame communicating with the receiving space and a first shoulder formed on the top frame under the at least one slot; and
    a mask having a base, a light source cap portion extending from a free side of the base and an extension extending from a free side of the light source cap portion extending into the receiving space so as to be supported by the first shoulder such that engagement between the fixed frame and the mask is finished, whereby a light source received in the mask is securely sandwiched between the fixed frame and the mask and light from the light source is dimmed by the top frame.

2. The light positioning frame as claimed in claim 1, wherein the fixed frame further has a side frame provided to two opposite sides of the fixed frame, each side frame has a boss extending from a bottom face of the side frame and a threaded hole defined through the side frame, a hole is defined through the base so as to receive therein the boss and a bolt is provided to extend through a cutout defined in a side face of the base and into the threaded hole to secure engagement between the fixed frame and the mask.

3. The light positioning frame as claimed in claim 2, wherein a second shoulder is extending in a direction opposite to that of the first shoulder so as to support a liquid crystal module.

4. The light positioning frame as claimed in claim 3, wherein there are multiple slots defined through the top face of the top frame.

5. The light positioning frame as claimed in claim 1, wherein there are multiple slots formed on the top frame and defined through the top face of the top frame.

* * * * *